United States Patent

[11] 3,599,872

| [72] | Inventor | Lauren W. Guth |
| --- | --- | --- |
| | | Louisville, Ky. |
| [21] | Appl. No. | 850,069 |
| [22] | Filed | Aug. 14, 1969 |
| [45] | Patented | Aug. 17, 1971 |
| [73] | Assignee | General Electric Company |

[54] SEALING MEANS IN A ROTATING SPRAY DEVICE
10 Claims, 7 Drawing Figs.

[52] U.S. Cl. ............................................. 239/261,
239/264, 239/259, 277/81, 134/176
[51] Int. Cl. ....................................... F16j 15/34,
F16j 15/54
[50] Field of Search .......................................... 239/261,
264 X, 251, 259 X; 277/81 X, 91, 94; 134/176 X,
179, 198

[56] References Cited
UNITED STATES PATENTS

| 455,151 | 6/1891 | Bartlett | 239/259 |
| 2,992,781 | 7/1961 | Howard, Sr. | 239/261 |
| 2,998,637 | 9/1961 | Wallis | 29/149.5 |
| 3,195,817 | 7/1965 | Sandie | 239/261 |
| 3,402,881 | 9/1968 | Moore et al. | 277/81 |

*Primary Examiner*—Lloyd L. King
*Assistant Examiner*—Reinhold W. Thieme
*Attorneys*—George C. Atwell, Harry F. Manbeck, Jr., Joseph B. Forman, Oscar B. Waddell and Frank L. Neuhauser ABSTRACT: A ribbonlike flexible strip or tape formed from a highly durable abrasion-resistant material having a low surface friction characteristic, such as is obtainable from nylon or fluorocarbon resin, is used to obtain a seal between a stationary tubular pedestal and a spray arm mounted for rotation thereon. The seal obtained therewith serves the purpose of substantially eliminating leakage of pressurized liquid passing through the hollow pedestal and into the body of the spray arm, and may, in one embodiment of the invention, be also utilized as a bearing in the assembly. The tape is supported by annular retaining portions extended from the tubular pedestal and the spray arm hub, and the ends of the tape loosely overlap each other. The tape is adapted to be radially outwardly enlarged against the annular retaining portions in response to liquid pressure whereby a sealing effect is obtained.

PATENTED AUG 17 1971
3,599,872
SHEET 1 OF 2
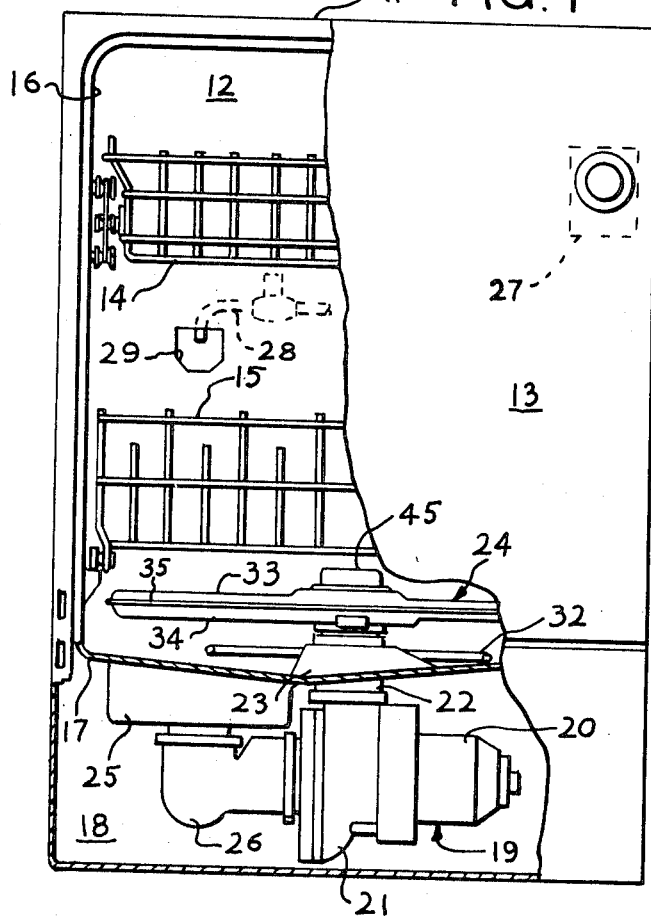
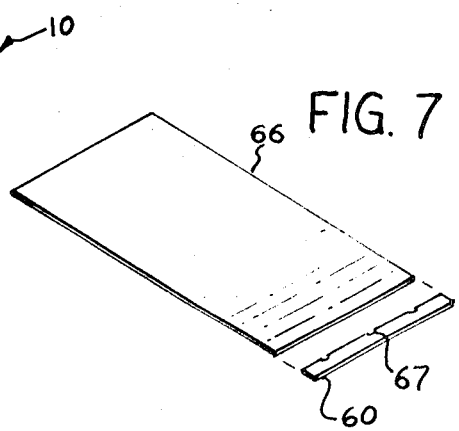
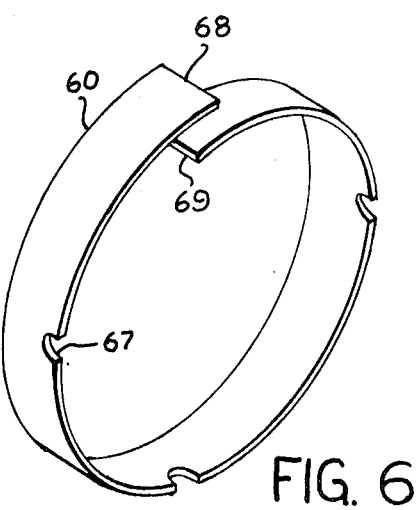
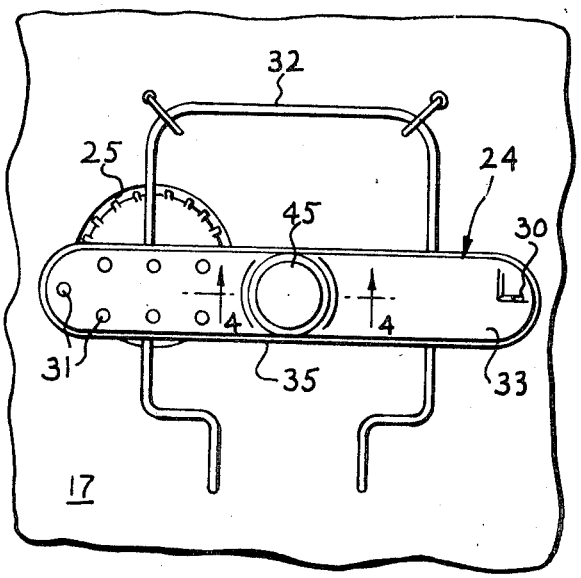
INVENTOR.
LAUREN W. GUTH
BY George C. Atwell
HIS ATTORNEY INVENTOR.
LAUREN W. GUTH
BY George C. Atwell
HIS ATTORNEY

3,599,872

SEALING MEANS IN A ROTATING SPRAY DEVICE

BACKGROUND OF THE INVENTION

This invention relates generally to rotatable spray devices and particularly pertains to means, in a reactive spray device, for sealing a rotatable spray arm on a stationary tubular pedestal.

The improved spray device of this invention is particularly adaptable for use in an automatic dishwasher. For example, in a typical dishwashing machine, such as the type of automatic dishwasher described in U.S. Pat. No. 3,451,400, and assigned to the assignee hereof, a fixed pump outlet conduit or tubular pedestal extends into the washing chamber of a dishwashing machine and has a rotatable spray arm mounted thereon for the purpose of distributing a washing liquid spray over tableware within the washing chamber. The present invention is an improved means of sealing the junction between the rim of the tubular pedestal and the hub of the spray arm, and may be incorporated into the aforementioned type of dishwashing apparatus.

Generally, in a dishwashing machine, some liquid leakage from beneath the rotating spray arm in a dishwasher is acceptable, provided there is not appreciable pressure drop. On some dishwashing machines a comparatively high-pressure pumping means may provide enough force to the liquid flow that the reactive spray device will operate properly regardless of leakage along the liquid passageway. Thus, the provision of a sealing means where the spray arm hub meets the stationary pedestal may be unnecessary. This invention, however, comprehends the use of a sealing means in the type of spray arm mechanism where only a small amount of leakage and decreased pressure can be tolerated.

A conventional arrangement for reliably supporting and sealing a rotatable spray arm on a tubular pedestal is to provide an endless flexible ring or gasket circumjacent the mounting lip or rim of the pedestal in combination with an annular retaining means such as an inwardly flanged ring nut threadably engaged on the pedestal. The gasket is adapted to be deformably compressed by pressure exerted by the ring nut when the nut is tightened to press its flange toward the pedestal rim in an axial direction. The inner periphery of the gasket extends radially inwardly from the ring nut and circumjacently overlaps the lip of the spray arm hub. The inner annular portion of the gasket is thus responsive to the pressure of the liquid flowing through the pedestal and to the spray arm. The flow of liquid forces the radially inward projecting portion of the gasket against the annular lip of the spray arm hub to thereby effect a seal.

The aforementioned seal arrangement is but one example of a number of different constructions presently employed for sealably supporting a rotatable spray arm on a tubular stationary pedestal. Gaskets or seals for the aforementioned purpose may be found with a wide range of shapes when taken in cross section. For example the shape variation can be readily seen by comparing the tubular shaped deformable seal disclosed in U.S. Pat. No. 3,213,866, with the seal construction disclosed in U.S. Pat. No. 3,370,869. Such seals are generally formed from a rubber or resin composition by a molding process or, in the case of a ring-shaped seal having a rectangular cross section, may be lathe cut from an extruded tube of the base material. Despite the different methods of constructing such seals and the diverse cross-sectional shapes available, a characteristic that is common to such seal arrangements is that the sealing effect obtainable therefrom is a function of the resiliency or elasticity of the material from which the gasket or seal is formed.

The present invention is a definite departure from the typical construction of a seal for use between a rotatable spray arm and a stationary tubular pedestal. The sealing means of the present invention does not depend for its sealing effect upon deformation of the body of the seal or the compression of any part of the seal between two rigid members. Rather, the seal construction provided in the present invention is a comparatively loose-fitting sealing member. The improved spray device made possible by use of this seal construction will operate to substantially eliminate liquid leakage and pressure drop at the junction between the terminal lip or rim of a tubular pedestal or pump outlet conduit and the adjacent rim of the hub of a spray arm supported for rotation on the conduit.

As compared to the type of sealing member typically employed in such apparatus the improved sealing means of the present invention is much simpler to manufacture and it is considerably less expensive to produce.

SUMMARY OF THE INVENTION

The present invention may be broadly described as an improved spray device for distributing a forced or pressurized flow of washing liquid in a spray pattern, such as is employed in an automatic dishwashing machine.

The sealing means employed is a ribbonlike band or tape, as opposed to the endless ring type of gasket more familiar to the art for the same purpose. The tape fits relatively loosely around the end of the outlet conduit, preferably in a circumferential groovelike channel provided on the conduit which acts, along with an overlapping annular hub portion, as retaining means for holding the seal in its operative position.

The seal is preferably cut as a strip from a master blank in the form of a relatively thin sheet of material having the characteristic of low surface friction such as is obtainable from polytetrafluoroethylene or a substance having closely similar physical properties thereto. The seal is installed by forming a loose circular band from the initially flat length of tape whereby the ends thereof overlap for a short distance when the seal is placed in its installed position within the aforementioned supporting channels. Internal liquid pressure forces the seal to increase its diameter and circumferentially sealably contact the annular outer walls forming the annular supporting channels. In this manner, liquid leakage and pressure drop is substantially eliminated.

BRIEF DESCRIPTION OF THE DRAWINGS

Further details of the operative characteristics of the seal and the construction of the improved spray device of the present invention are set forth in the ensuing detailed description wherein:

FIG. 1 is a front elevational view of an automatic dishwashing machine having a portion of the front side of the machine's cabinet cut away to reveal internal components of the machine;

FIG. 2 is a plan view of the lower end of the washing chamber of the machine shown in FIG. 1;

FIG. 6 is a perspective view of the gasket or seal component of the improved spray device of the present invention which is utilized in the portion of the mechanism shown particularly in FIGS. 3—5 as described hereafter, and FIG. 7 is a perspective view of a planar flexible sheet of the material from which the sealing member of the present invention is formed

DESCRIPTION OF THE PREFERRED EMBODIMENT

Figure 3:
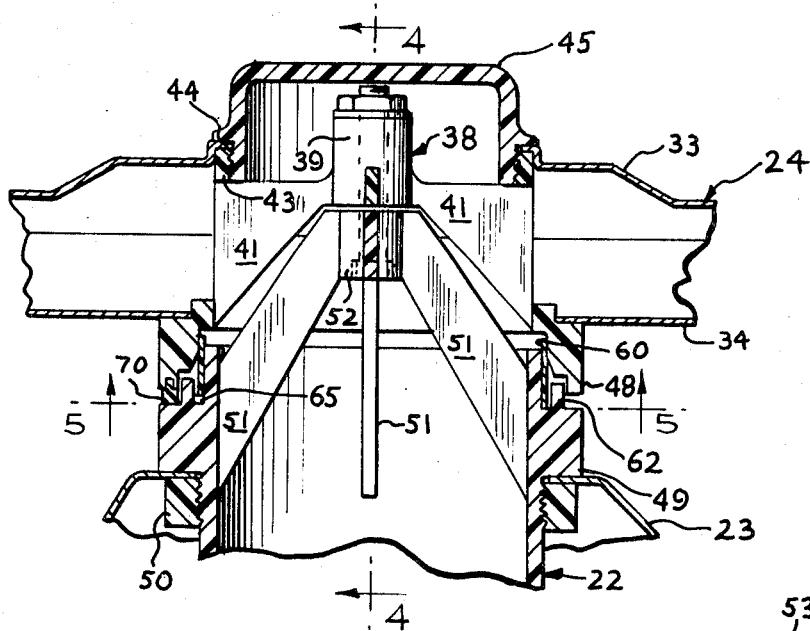
FIG. 3 is an enlarged view in vertical section of a portion of the improved spray device of the present invention that is included in the dishwashing machine of FIG. 1.

The preferred embodiment of the present invention is hereafter described and illustrated in the accompanying drawings as it appears in a dishwashing machine having the laterally elongated type of reactive spray arm located in the lower end of the machine's washing chamber. It is contemplated that the sealing arrangement of this invention could be employed in an apparatus including other spray arm configurations. For example, the spray arm could be a vertically elongated tubular spray distribution means having intermediate or upper end jets capable of driving it in rotation on its vertical axis. The sealing arrangement described herein would be adaptable to the latter type of spray arm and others without modification of the basic design. As used herein, the term "rotation" is intended to include oscillation as well as continuous rotary motion.

Referring now to the drawings and particularly to FIG. 1, there is illustrated an automatic dishwashing machine 10 of the domestic or household type including a cabinet 11 defining an internal washing chamber 12. Access to the washing chamber 12 is obtained by opening a front door 13 that is hinged along its lower edge whereby it may be opened outwardly downwardly to permit slidably mounted upper and lower dish supporting racks 14 and 15 to be manually drawn outwardly through an access opening 16 to facilitate loading and unloading of tableware therein.

The lower end of the washing chamber 12 is defined by a centrally downwardly sloped washing chamber floor portion or bottom wall 17. The bottom wall 17 separates the washing chamber 12 from a lower motor-pump compartment 18. Contained within the compartment 18 is a motor-pump assembly 19 that includes an electric motor 20 and a pump 21. The pump 21, which is driven by automatic energization of the motor 20, is for the purpose of recirculating washing liquid in the operation of the machine 10 and for draining washing liquid out of the machine to the household sewage system at the completion of a rinse or a washing cycle in the operation of the machine 10.

Extending upwardly from the housing of the pump 21 is stationary tubular member forming a rigid pump outlet conduit or pedestal 22. The pedestal 22 extends upwardly through a humped floor portion 23 of the bottom wall 17, in sealed relation therewith. The upper end of the conduit 22 extends into the washing chamber 12 and acts both as a support post for rotatably supporting a hollow spray arm or spray arm member 24 thereon and for a means of conducting recirculated washing fluid from the pump 21 and into the hollow body of the spray arm 24.

The bottom wall 17 of the washing chamber 12 has a substantially large drain opening therethrough which permits washing liquid accumulated in the washing chamber 12 to empty downwardly into a funnellike sump 25. Interconnecting the lower output opening of the sump 25 with the input side of the pump 21 is a conduit 26 that serves to conduct washing liquid from the sump 25 and into the housing of the pump 21 for recirculation upwardly therefrom for distribution from the spray arm 24.

The spray arm 24 is of the reactive type, that is it is provided with at least one discharge port 30 (FIG. 2) adapted to emit a jet discharge generally in the direction of the plane of rotation of the spray arm 24 whereby the spray arm will be driven in rotation in reaction to the jet flow therefrom. A plurality of spray outlet orifices 31 are provided in the upwardly facing surface of the spray arm 24 for dispersing a liquid spray pattern over tableware carried in the racks 14 and 15 within the washing chamber 12.

Generally, the operation of such a machine involves a sequence of rinse and wash steps and a final drying step. At the end of each step in the operation of the machine 10, the effluent is pumped out of the machine and clean water is conducted in the washing chamber for the next step. For the wash step or steps, detergent is automatically added to the water by timer-actuated means (not shown). A resistance heating element 32 is mounted adjacent the bottom wall 17 and is energized automatically by the timer control to generate heat in the washing chamber 12 for the final drying step in the operation of the dishwasher 10.

As shown in FIGS. 1 and 2, the spray arm 24 is a horizontally elongated shell-like casing comprised of upper and lower complimentary formed portions 33 and 34 that are joined together by a common peripheral side seam 35. The upper and lower spray arm portions 33 and 34 define an internal liquid passageway 36 that communicates with a vertical liquid passageway 37 defined by the sidewall of the pedestal 22 that serves as a support post for the rotatable spray arm 24. Centrally located and vertically aligned large circular openings are provided through the upper spray arm portion 33 and the lower spray arm portion 34 for receiving a hub member 38 therein in a substantially tight slip-fit accommodation.

Figure 4:
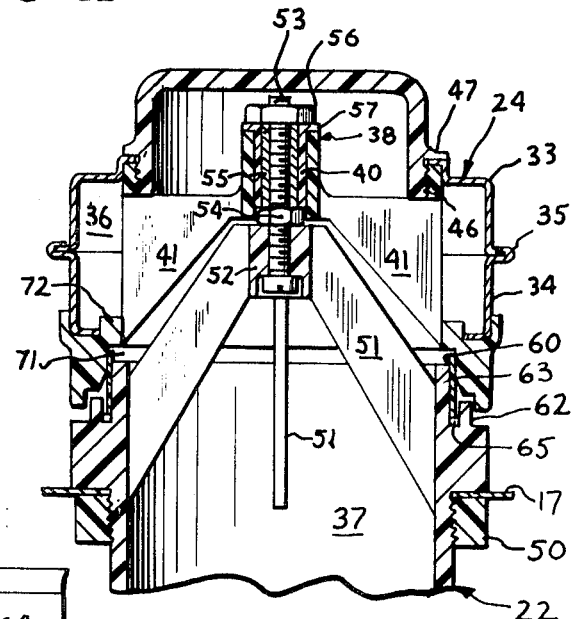
FIG. 4 is a view in vertical section of the portion of the spray device mechanism shown in FIG. 3, as taken substantially along lines 4—4 of FIG. 3.

As shown in FIGS. 3 and 4 the hub 38 has an outwardly disposed coaxial collar portion 39 that is axially bored to receive a tubular nylon bushing 40 therein. A plurality of rigid circumferentially spaced-apart rigid bladelike portions 41 extend radially outwardly from the lower end of the collar portion 39. Each of the bladelike portions 41, of which (in the embodiment shown) there are four in a quadrant disposition relative to each other, has a substantially narrow vertical portion immediately adjacent the collar like portion 39 from which it integrally extends. At its extreme outer end, each bladelike portion 41 has a relatively long vertical dimension approximately equal to the depth of the passageway 36 through the spray arm 24. Each portion 41 has a planar configuration with a substantially thin horizontal dimension whereby large interstices are provided between the adjacent bladelike portions 41 to permit unimpeded passage of liquid from the conduit passageway 37 upwardly through the hub 39 and to the spray arm passageway 36.

The hub 38 further comprises an annular ring-shaped rigid portion 43 that interconnects the top outside corners of the bladelike portions 41. The upwardly facing surface of the ring-shaped portion 43 meets and seals with an annular offset spray arm member portion 44 provided around the periphery of the central circular opening through the upper spray arm member 33. A rigid cup-shaped cap or cover 45 is provided to enclose the upper end of the hub 38. The cover 45 is provided with external threads 46 on its outer surface adjacent its annular lip end, and an annular radially outwardly projecting flange 47 is provided on the cover 45 adjacent the threaded portion 46. The inner face of the hub's upper annular ring-shaped portion 43 is provided with threads to receivably engage the cover 45 whereby the under face of the annular flange 47 is drawn down tightly against the annular spray arm offset portion 44. The lower end of the hub 38 is an integral ringlike annular portion or hub rim 48. The hub rim 48 has a diameter substantially larger than the other portions of the hub 38, and it is shaped to cooperate with the upper end of the conduit 22 in acting to support a band or ribbonlike tape seal 60 therebetween.

Figure 5:
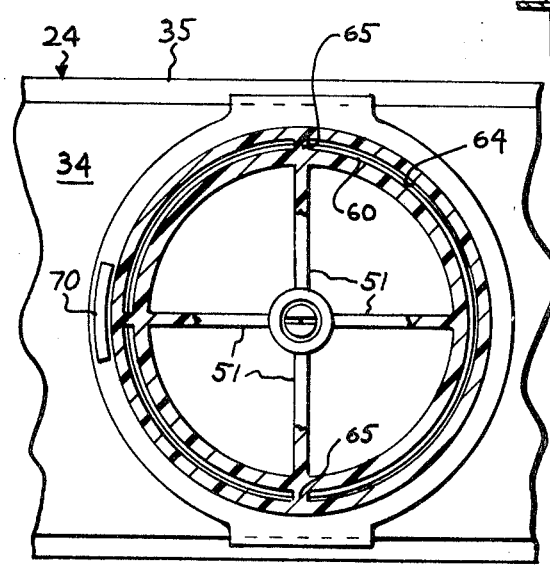
FIG. 5 is a horizontal sectional view looking upwardly along lines 5—5 of FIG. 3.

The upper end of the vertically oriented pump outlet conduit 22 is provided with a radially outwardly projecting annular shoulder portion 49 that operates cooperatively with a ring nut 50 for mounting the conduit or tubular member 22 in sealed relation through the central opening in the humplike portion 23 of the washing chamber's bottom wall 17. The hub 38 of the spray arm 24 is centrally supported on a rigid spider or framework jutting upwardly from in the inside surface of the conduit 22. This supporting framework is comprised of four radially exposed vanelike legs 51 formed integrally with the conduit 22. Each of the legs 51 extends from the inside surface of the conduit 22 and inwardly upwardly, as shown in FIGS. 4 and 5, where it terminates with the other three identical legs 51 in an axially oriented cylindrical portion 52. The cylindrical portion 52 is axially bored to accept a mounting bolt 53 therethrough which extends upwardly and through the central bore in the collarlike portion 39 of the hub 38. A nut 54 is threadably carried on the shank of the bolt 53 to fasten the bolt 53 firmly in the cylindrical portion 52. The upper end of the bolt 53 that extends through the portion 39 of the hub 38 has a tubular substantially thin walled spacer or metallic bushing 55 therearound. The outer surface of the metallic bushing 55 serves as a bearing surface against which the nylon bushing 40 turns when the spray arm 24 is rotating.

A comparatively large retaining nut 56 is threadably carried at the end of the bolt 53 to retain the bushings 40 and 55, and the hub 38 in their respective operative positions relative to the conduit 22. The nylon bushing 40 is provided with a radially outward extending annular flange portion 57 that turns against the undersurface of the retaining nut 56 of the shank of the mounting bolt 53. It should be noted that the nylon bushing 40 is firmly press fitted into the bore of the hub 38 coaxial collarlike portion 39 whereby the bushing 40 will turn in unison with the rotating hub. The flange 57 of the bushing 40 may be provided with a downward projecting finger portion accommodated by a groove in the upper lip of the hub's collarlike portion 39 (neither of the latter two elements are shown) to prevent the bushing 40 from turning relative to the hub 38. The bushing 55 provides a hard outer surface against which the inner surface of the bushing 40 will bear when the spray arm 24 is rotating.

As shown in FIGS. 3 and 4, the upper end of the conduit 22 is especially formed with a specific outer end configuration to accommodate the tape or coiled band 60 that serves to substantially eliminate leakage between the conduit 22 and the hub 38 of the spray arm 24. The annular shoulder portion 49 of the conduit 22 is comparatively thick as viewed in cross section and has an annular upwardly projecting ridge 62 extending from its upper surface. The ridge portion 62 is spaced apart a short distance from the outer sidewall of an end rim portion 63 whereby a circumferential groove or channel 64 is defined therebetween. It will be noted that the annular portion 63 extends axially upwardly at a considerably greater distance as compared to the upward extension of the ridge 62, and serves to inwardly circumferentially support the tape 60 in its installed position. The width of the tape 60 is such that an upper annular peripheral portion of the seal 60 extends beyond the rim portion 63 of the conduit 22. Outer support is provided for the aforementioned peripheral portion of the seal 60 by the inner surface of the annular portion 48 of the hub 38.

As shown in FIG. 6 the sealing member or tape 60 is a highly flexible relatively thin strip preferably formed from a nylon or fluorocarbon resin or the like so as to have the characteristic of low surface friction. The strength and useful life of the sealing member 60 can be substantially increased by utilizing a fiber-reinforced material. For example, in a prototype that was constructed in the development of this invention the planar sheet from which the tape was severed was a polytetrafluoroethylene composition having discrete monofilament glass fibers dispersed therethrough for the purpose of reinforcement.

In FIG. 7 there is shown a flat planar flexible sheet or master blank 66 composed of a material having the preferred attributes as heretofore described. The cutting or separation of each separate strip sealing member 60 from the blank 66 can be accomplished in a single stamping or shearing operation which may include the provision of spaced-apart curved notches 67 along one edge thereof. As shown in FIG. 5, when the sealing member 60 is wrapped or coiled (as shown in FIG. 6) and installed in the annular channel 64, the notches 67 will align with the slip down over the channel ridges 65 and act cooperatively therewith to hold the sealing member 60 stationary relative to the conduit 22 when the spray arm 24 is rotating. It will be noted in FIG. 5 that three of the spaced-apart ridges 65 are employed in the embodiment shown and that a similar ridge is excluded from an area 67 of the channel 64 since this is the area where overlapping ends 68 and 69 of the sealing member 60 are positioned.

In the embodiment of the invention shown in the drawing, a comparatively small semirigid thrust block 70 (FIG. 5) is provided to serve as a bearing member between the hub 38 and the upper end of the conduit 22. The thrust block 70 is considered an optional element in the spray device, its use depending upon structural tolerance between the hub 38 and the conduit 22. As shown in FIG. 4 the upper end of the bearing block 70 is firmly embedded in a socket provided in the annular portion 48 of the hub 38. The downwardly facing surface of the block 70 will guide against the upwardly facing surface along the outer edge of the annular shoulder portion 49 of the conduit 22. Employment of the block 70 is not considered absolutely necessary even when the rotatable spray arm is of the unbalanced type. However, if the block 70 is employed in the assembly, it is preferably constructed from a suitable low-friction wear-resistant material such as glass fiber reinforced polytetrafluoroethylene. In the event that a radically unbalanced spray arm is utilized, a plurality of circumferentially spaced-apart blocks 70 could be employed.

During the operation of the dishwashing machine 10, when the pump 21 is being operated to recirculate washing liquid through the passageway 37 of the conduit 22 and to the passageway 36 within the body of the spray arm 24, the radially outward pressure or force of the circulating liquid will force the seal 60 radially outwardly. An annular open area 71, disposed directly vertically adjacent the annular portion 63, permits the liquid to contact the inner surface of the sealing member 60. In response to the liquid pressure the sealing member 60 will undergo a slight enlargement, that is, its diameter will increase slightly whereby its overlapping contiguous end portions 68 and 69 will move slightly in relation to each other and the outer surface of the sealing member 60 will circumferentially contact the inwardly facing surfaces of both the hub's annular portion 48 and the annular ridge 62 in a substantially liquidtight relation therewith.

The contact out of the outer surface of the sealing member 60 against its retaining means thereby substantially seals off the junction between the spray arm hub 38 and the lip of the pedestal or tubular member 22, and serves to effectively reduce liquid leakage at the junction and the extreme pressure drop that would otherwise occur.

It should be noted that an annular inwardly projecting ledge 72 prevents the sealing member 60 from moving upwardly and out of position. It should be noted also that the body material of the sealing member 60 undergoes no distortion or temporary deformation either from the rigid retaining means in which it resides or from the pressure of the liquid exerted radially thereagainst.

As will be evident from the claims appended hereto, it is not intended that the invention be limited only to the particular embodiments mentioned heretofore or to the specific details of the construction illustrated in the accompanying drawings.

What I claim as new and desire to secure by Letters Patent of the United States is:

1. In a liquid spray device having a hollow spray arm member rotatably supported on the end of a stationary tubular member, wherein the hub of the spray arm member is adapted to receive a pressurized flow of liquid from the stationary tubular member, improved means for reducing liquid leakage at the junction of the spray arm hub with the lip of the tubular member, comprising:
    a. a pliable tapelike seal having a low surface friction characteristic, disposed in an annular orientation at the junction,
    b. annular retaining means integral to at least one of said members and disposed outwardly circumjacent said seal,
    c. annular inner support means integral to at least one of said members and disposed inwardly circumjacent said seal, and
    d. said seal being disposed loosely with respect to said support means at said junction such that the pressure of the liquid flowing from the tubular member to the spray arm member will urge the seal outwardly against said annular retaining means.

2. The combination set forth in claim 1 wherein said seal is a loosely coiled strip having ends which overlap each other.

3. The combination set forth in claim 1 including means for engaging said seal whereby said seal is held fixed relative to the stationary tubular member when the spray arm member rotates thereon.

4. The combination set forth in claim 1 wherein said seal is formed from polytetrafluoroethylene material.

5. The combination set forth in claim 1 wherein said seal is formed from a fiber-reinforced material.

6. In a washing liquid spray device for a dishwashing machine wherein a stationary tubular pedestal extends into the washing chamber of the machine, a bottom spray arm is supported for rotation on the pedestal rim, and the spray arm is in liquid flow communication with a liquid passageway through the pedestal, the improvement comprising:
 a. a ribbonlike flexible strip disposed annularly at the junction and adapted to fit loosely between the spray arm and the pedestal rim whereby the ends of said strip overlap each other,
 b. annular retaining means disposed outwardly circumjacent said strip for holding said strip in place at said junction, and
 c. said strip being adapted to respond to pressure of liquid flowing from the pedestal passageway and into the spray arm whereby the outer surface of said strip is forced against said annular retaining means to form a seal in cooperation therewith.

7. The combination set forth in claim 6 including means for preventing said strip from moving relative to the pedestal when the spray arm is rotating.

8. The combination of claim 6 wherein said strip is of a material having the characteristic of low surface friction.

9. The combination of claim 6 wherein said strip is formed from polytetrafluoroethylene.

10. The combination of claim 6 wherein said strip is formed from a fiber reinforced material.